(No Model.) 4 Sheets—Sheet 1.
E. THOMSON.
SYSTEM OF ELECTRIC DISTRIBUTION FOR ALTERNATING CURRENTS.
No. 372,501. Patented Nov. 1, 1887.
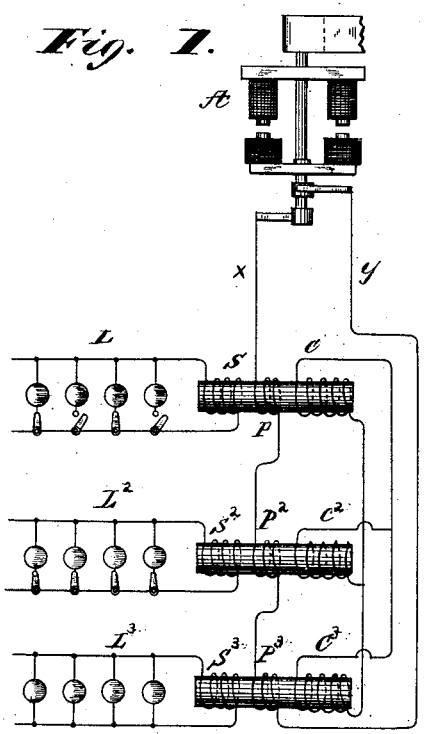
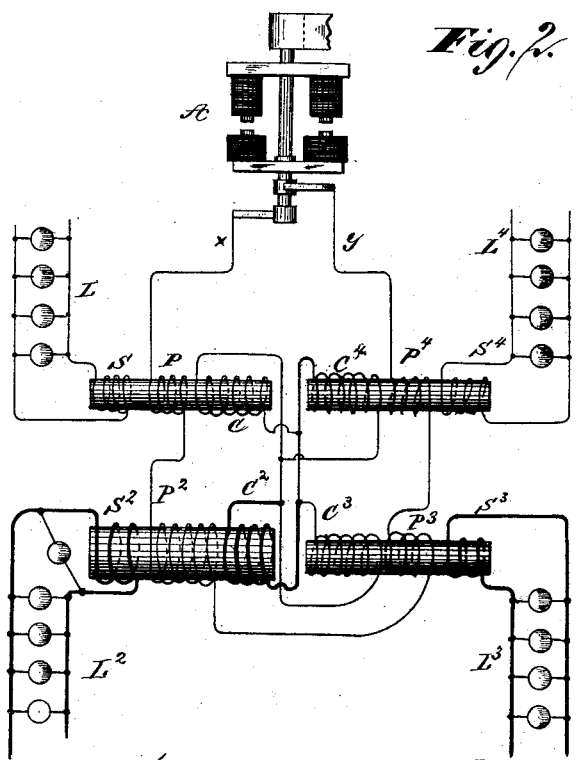
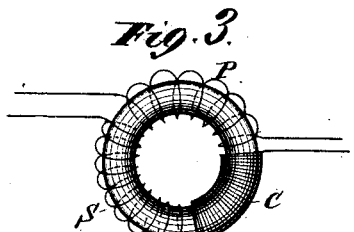
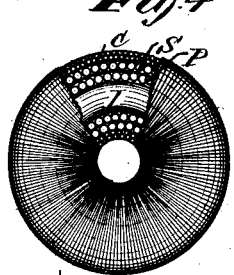
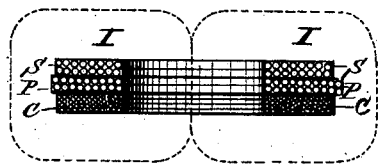
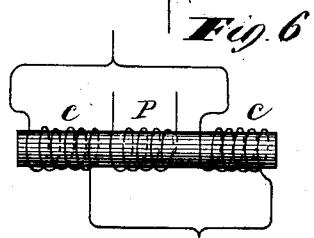
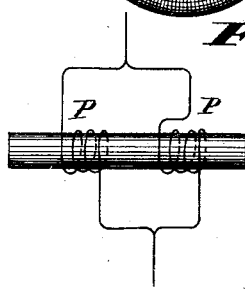
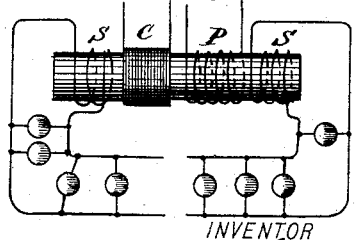
WITNESSES:
INVENTOR
Elihu Thomson.
BY
Townsend & MacArthur
ATTORNEYS

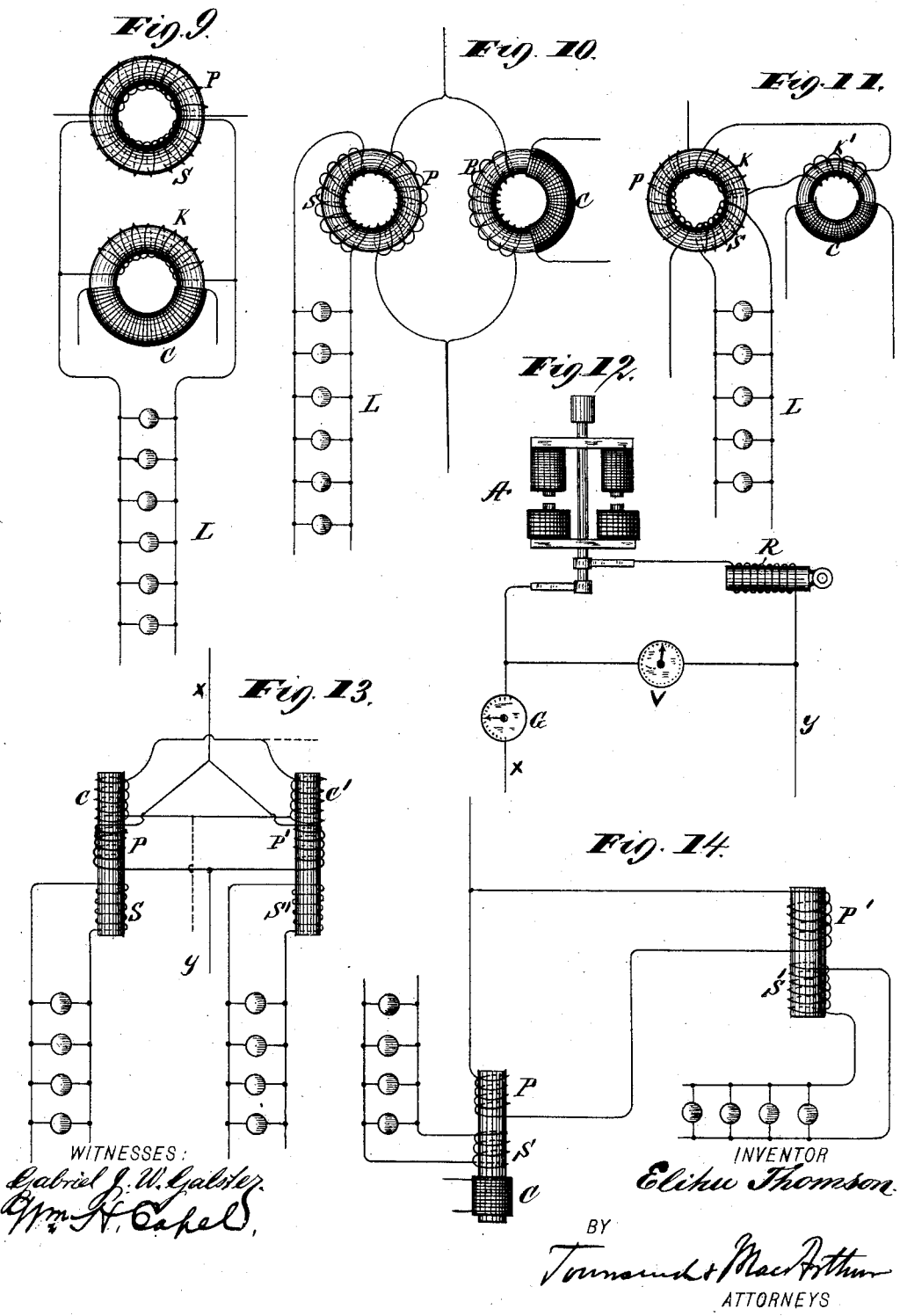

(No Model.)  4 Sheets—Sheet 3.
E. THOMSON.
SYSTEM OF ELECTRIC DISTRIBUTION FOR ALTERNATING CURRENTS.
No. 372,501.  Patented Nov. 1, 1887.
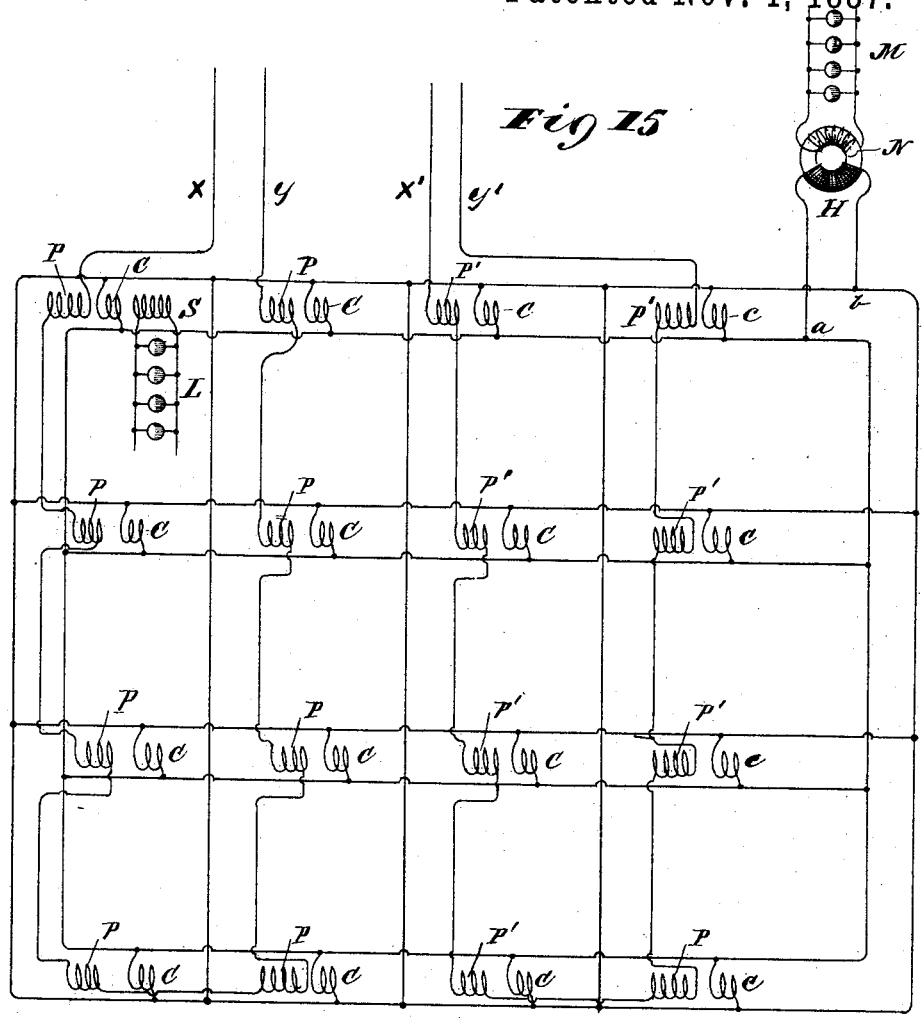
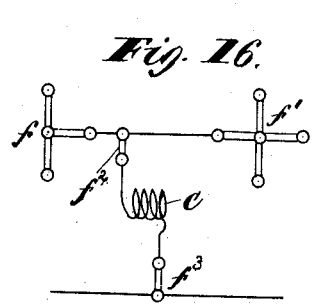
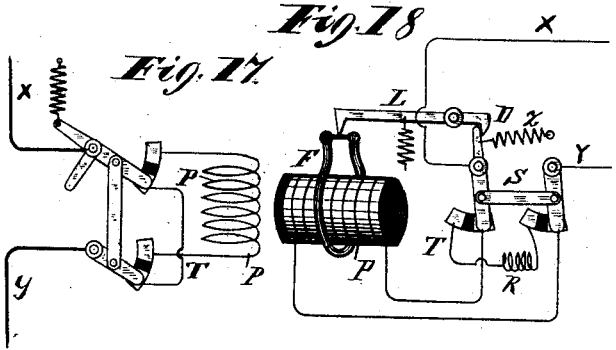
WITNESSES:
Gabriel J. W. Colster.
Wm. H. Capel.
INVENTOR
Elihu Thomson.
BY
Townsend & MacArthur
ATTORNEYS

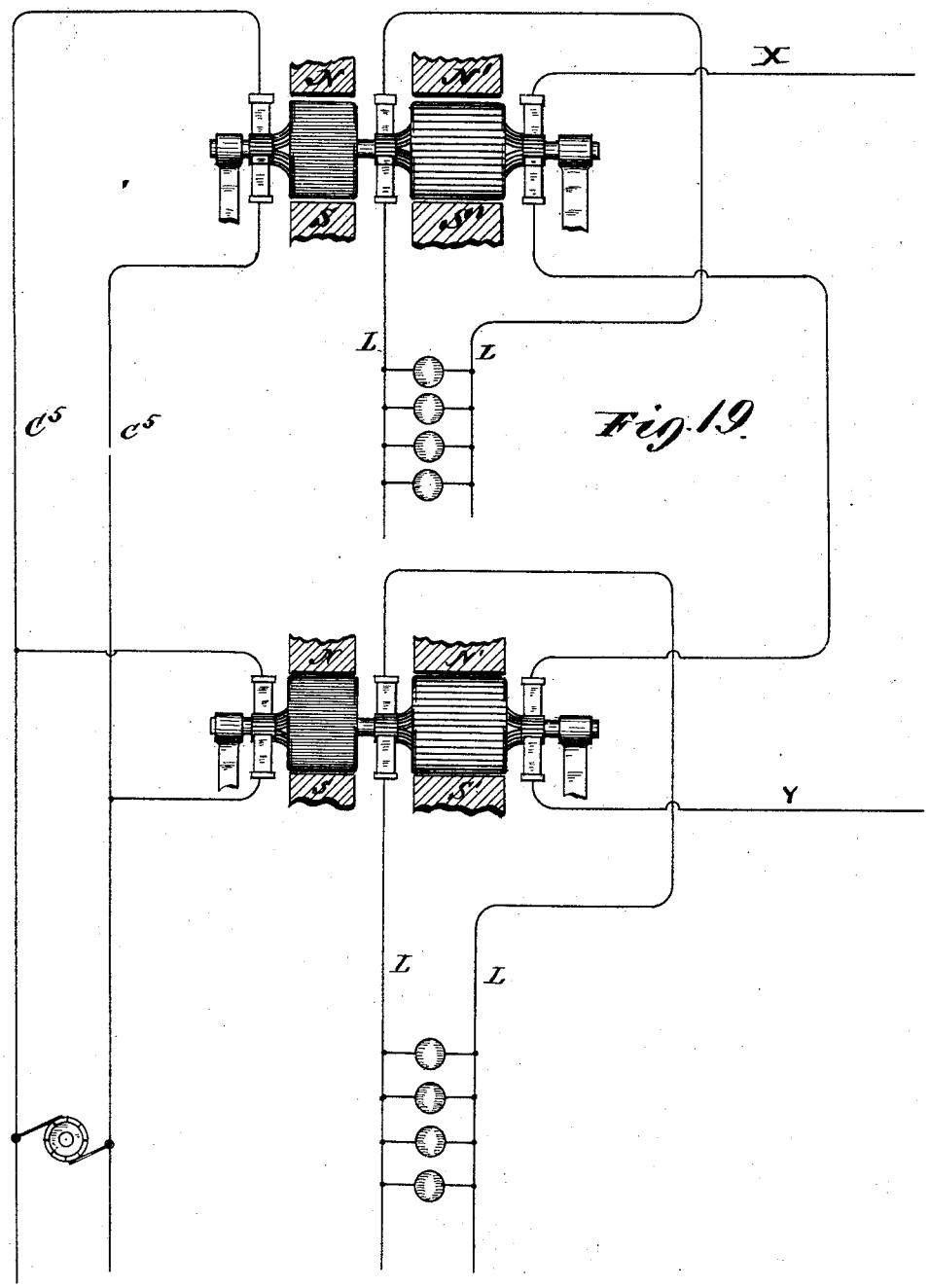

UNITED STATES PATENT OFFICE.

ELIHU THOMSON, OF LYNN, MASSACHUSETTS.

SYSTEM OF ELECTRIC DISTRIBUTION FOR ALTERNATING CURRENTS.

SPECIFICATION forming part of Letters Patent No. 372,501, dated November 1, 1887.

Application filed March 7, 1887. Serial No. 229,915. (No model.)

*To all whom it may concern:*

Be it known that I, ELIHU THOMSON, a citizen of the United States, and a resident of Lynn, in the county of Essex and State of Massachusetts, have invented a certain new and useful System of Electric Distribution for Alternating Currents, of which the following is a specification.

My present invention relates to those systems of distribution of electric energy in which induction-coils, combined motors and generators, or other forms of converter are employed, but is more especially designed with reference to those systems employing induction-coils whose secondary coils are used to feed local lines with incandescent lamps or other translating devices, and the primary coils of which induction-coils are in series and traversed by current from any suitable source. The primary line is carried through the primary conductors in series wherever the induction-coils may be placed on the line.

My invention is especially applicable to those systems in which the source of currents is an alternating-current source—such as an alternating-current dynamo placed at a station and having its poles connected through the primary or primaries of an induction coil or coils—but is likewise applicable to the similar systems in which a continuous-current source is employed and proper alternating or other variations of current in the primary or primaries necessary for setting up secondary currents are produced by commutators operated by any suitable means and connected with one or more of the several induction coils employed in the circuit.

My invention is also applicable to other kinds of converters besides induction-coils—as, for instance, to those consisting of combined electric motors and generators, the motors being placed on the main circuit and the generators driven by such motors being connected to the local lines supplying the incandescent lamps or other devices. Hitherto the distribution of energy by such systems has been very imperfect, because of the impossibility of equalizing the potentials at the various parts of the system, so as to permit the turning off of lamps or other devices, as may be desired.

In my invention I employ a novel addition in the form of a set of compensating-coils and connections from one to another of these coils or other converters, whereby the effects of cutting out lamps in any part of the system will be equalized in such way that the potential remains unchanged in the remaining lamps fed by the same secondary coil from which the lamps were cut or in the other lamps fed by the remaining secondaries. The great advantage of my invention is the securing of a practical equalizing of potential over the whole district lighted or fed by electric energy, no matter what the load or number of lamps may be.

I will proceed to describe one of the applications of my invention by reference to the figures; but it is capable of modifications and additions of more or less utility, the elements being in the particular system herein shown a primary line fed by currents preferably alternating and of nearly-constant or slightly-increasing potential as the load increases, (a suitable generator being used,) primary coils of several induction-coils in series in said line, secondary coils inductively related to said primaries feeding lamps or other devices on local lines, as usual, and compensating-coils inductively related to said primary coils, or to both, and connected, as will be described, for equalizing the actions upon the secondary coils of the system, so as to secure equal potentials throughout.

In the accompanying drawings, Figure 1 shows a plan of my invention in its simplest form. Fig. 2 shows a plan of my invention in a more complete application. Fig. 3 is a diagram showing the relations existing between the primary coil, the secondary, and the compensator or equalizer. Figs. 4 and 5 show preferred constructions of induction-coil with the triple coil or three windings. Figs. 6, 7, and 8 show modified ways of applying my invention. Figs. 9, 10, and 11 show equivalents of the compensators, less useful in most cases than those in prior figures. Fig. 12 shows a detail, and Figs. 13 and 14 show a branched primary line as used with compensators or equalizing-coils. Fig. 15 is a diagram of an extended system embodying my invention. Figs. 16, 17, and 18 show details of the system.

Fig. 19 illustrates the application of the invention to a compound motor and generator system of distribution.

In Fig. 1, A is an alternating-current dynamo at a station where power can be applied. It is of a type capable, by automatic or hand regulation, or by a means of adjustment applied to the conductors leading therefrom, of supplying a constant or slightly-increasing potential average between its mains $xy$, the current and potential being alternating in its character at the rate of fifty to two hundred and fifty alternations or more per second. The wires $xy$ are carried to the point where the energy is to be delivered, and with a high potential—say one thousand to fifteen hundred volts—may traverse a long distance with moderate size of conductor. Arranged at suitable intervals at or near the points where the energy is to be delivered are the induction-coils, whose primary coils $P P^2 P^3$ are in series on the line $xy$, and the number of which coils will depend upon the prime potential at command and the number of convolutions of wire in each. Increasing or decreasing the potential of line $xy$ enables corresponding variations to be made in the number and arrangement. Wound on the same cores with $P P^2 P^3$ are the secondary coils $S S^2 S^3$, connected to local multiple-arc circuits of lamps or other translating devices, $L L^2 L^3$, for house-lighting or the like. The lamps or other devices may be arranged, as usual, in multiple, with switches to cut them off when desired, either as groups or singly. Such a system would, however, fail to give satisfactory results, because the cutting off of lamps would increase the brilliancy of the remaining lamps in that group to which the lamps cut off belonged, as the whole energy of the primary corresponding thereto would be concentrated on them and more energy be delivered thereat, while the lamps worked by the other primaries would lose their brilliancy on account of the line-current having been diminished by the increased counter electro-motive force set up in the primary which worked the group from which lamps were cut off. The only way in which the system will work with a varying number of lamps is when an equal lamp energy is cut off from each secondary in the system. Under such conditions, the line $xy$ being of constant potential at the ends of the series of primary coils, just such a current will pass as will suffice to work the lamps in use; but such a condition of variation of load is not a practical one when the induction-coils are distributed over a district at distances apart more or less great. By the application of a third conductor in the induction system or on the induction-core I overcome the difficulty. This third conductor I call the "compensator" or "equalizer," as it is neither a primary nor secondary coil, but may act as either.

$C C^2 C^3$, Fig. 1, are the compensators. They are wound, preferably, with fine wire of many turns and connected together by comparatively small conductors, which, however, are of no practical resistance between the compensators, because of the fineness of wire and high potential of the compensators which they connect. The compensators in the system $C C^2 C^3$, no matter how many exist, are connected in multiple—that is to say, their terminals which, under induction from the primary coils $P P^2 P^3$, are simultaneously positive are connected together, and those which are simultaneously negative similarly united, so that they are in multiple arc. The winding of the compensators is best made such that with equal loads in the secondaries at $L L^2 L^3$ or with no loads therein the induction from the primary coils will develop at the terminals of the compensators equal potentials or substantially the same potentials. Under such conditions no or little current will flow in the lines joining the compensators $C C^2 C^3$; but under unequal loading at $L L^2 L^3$ the compensators come into play to equalize the voltage, or, rather, to preserve the voltage in the lamps alight, no matter where they may be found. Thus, if $L$ have but few lamps turned on, the induction from $P$, its primary, instead of expending itself in the secondary $S$ and greatly raising the volts of the few lamps, finds an outlet in compensator $C$, raising its potential a little above that of the other compensators, $C^2 C^3$, upon which compensator $C$ becomes a generator of current impulses, which pass from it through $C^2 C^3$ in multiple and cause an increased counter electro-motive force to the primary currents in $P^2 P^3$, and at the same time the coils $C^2 C^3$ act partly as primaries for the secondary coils $S^2 S^3$.

The result of all the interactions is a practical compensation such that light may be turned out anywhere without affecting the potential of the remainder to a noticeable degree. It is advisable that the resistances of all the coils relatively to the current and electro-motive forces with which they have to deal be kept as low as possible, as this all conduces to perfect working. Still, as the primaries $P P^2 P^3$ are in series and the feeding-line $xy$ of high potential at the dynamo, and the compensators $C C^2 C^3$ are of fine wire and high potential, the connecting-lines of the primaries and of the compensators need not contain excessive amounts of copper.

Fig. 2 shows a similar system to Fig. 1. The design of the figure is to show that different sizes of induction coils may be used in the same system and lamps requiring different volts, while securing all the advantages of the system. Coils $P$, $P^3$, and $P^4$ are shown as having less turns and wound upon a smaller size core than $P^2$; but the extra power of coil $P^2$ is expended on a coarser-wire secondary coil, $S^2$, than $S$, and a larger number of lights, $L^2$, are thereby worked. In this case the compensator $C^2$ should be of larger wire, but should still give equal potential to the others when the system is fully loaded with lights. It may therefore have fewer turns, as it surrounds a larger core. Secondary $S^3$ is shown of heavy wire and few turns. It is presumably working lower-volt lamps than secondary S or S⁴. The system, however, is very flexible, and permits departures from strict proportioning, provided that compensating adjustments be made.

For simplicity, in Figs. 1 and 2 I have shown coils P, S, and C, &c., on a straight core; but in practice a closed core of iron, as a ring well divided or laminated, is better, such as shown in Fig. 3, coil C being of finer wire than the other coils.

It is still better to wind the coils in sections alternately around the core or in superposition, as in Fig. 4, P being inner, S next, and C outer. Other arrangements may be made, as it is only essential that a free induction take place between all the coils. In Fig. 5 they are shown as flat coils laterally adjacent, P P S S C C, and are wound over with iron wire, as indicated at I, passing through the axis and over the outside, so as to form a short magnetic circuit closed at all times around the coils.

Fig. 6 shows a single primary coil P, with two compensator-coils C C connected in multiple. Fig. 7 shows two primary coils P P connected in multiple. Fig. 8 shows one primary coil P, one compensator-coil C, and two secondaries S S on the same core or axis. Such variations may be extended and are within the scope of my invention.

It is not essential that the compensator-coil be on the same core with the other coils.

Fig. 9 shows a primary P feeding a secondary S and a branch, K, from said secondary passing around a core, upon which is also wound the compensator C. The action is somewhat less perfect in this disposition, because the compensator is farther removed from the primary P. The cutting off of lamps at L raises the potential of S, which then increases current in K, inducing a current in coil C, which passes by the compensating lines to the other compensators, as before. With the system loaded, little or no current circulates in C or K.

Fig. 10 shows another arrangement. In this case the primary line is branched through coils P and B, with a secondary, S, in inductive relation to P and connected to the lamps L. A compensator, C, is inductively related to B. Cutting off lights in L causes less current to flow in S, less current in P, and more in B, this latter increase inducing a compensating current in C, or, in other words, so raising the potential of coil C above that of the other coils to which it is connected that it will discharge current through them.

In Fig. 11 the compensator C is inductively related to primary P and secondary S through coils K and K', as shown, and if the connections are made such as to cause the impulses generated in C to have polarities simultaneously the same as those of the other compensating-coil terminals in the system, and to which terminals those of C are connected, like effects to those in Figs. 1 and 2 will be produced, but of much more imperfect nature.

Fig. 12 shows attachments to the alternating generator which it is desirable to provide as indicators of excessive current or potential, or the reverse, and to control the same. R is a reactive coil of low resistance and high self-induction, with a movable core to control its reactive effects, as desired. Inserting the core cuts down the main current from the alternator A, and pulling out the core increases it. V is a voltmeter for alternating currents, used as an indicator of potential difference between $x$ and $y$. During normal working of the system this should indicate nearly constant potential or a slight increase of potential as the load of lamps is added by turning them on. The galvanometer or ammeter G gives an indication of this load at any time existing by reading the currents on the mains. The coil R permits the control of the potential at V, so that when the machine A does not possess the requisite properties in maintaining a constant potential, as indicated at V, or increasing the same with increased load, the core of R is moved to secure the adjustment needed.

Fig. 13 shows that the primary line $x y$ may be at any point branched through two coils, P P', provided with secondaries S S', as shown, and compensators C C', suitably wound and connected to a general compensating system in multiple by the dotted connections.

Fig. 14 shows how, in an arrangement such as is shown in Fig. 13, one compensator C alone may be used instead of two; but the action is less perfect in such case.

Fig. 15 shows a type of several plans of circuit adapted to towns or districts in towns, and in which the compensators C C C, &c., are wound so as to be as in Fig. 1, and are connected to a net-work of wires joining them in multiple over the whole district. The primary lines, of which there may be one, two, or more in inductive relation to the compensating net-work, are indicated at $x y$ coming from a generating-station, and $x' y'$ likewise. The primary coils P P P, &c., and P' P' P', &c., are in two series, as shown.

The secondary local lines are left out of the figures to save complexity, one only being indicated at S, the lights L supplied by which may be scattered over a block of buildings by the local wires or otherwise disposed.

The arrangement shown in Fig. 15 may constitute a street-service system, and may be indefinitely extended to include a large district. In such a system the compensating-mains may be occasionally tapped for local lighting, as at $a\ b$, connections being carried through a fine-wire coil, H, in inductive relation to a coarse-wire secondary coil, N, supplying a local circuit of lights, M; but this forms no part of my present system of compensation, but will be embodied in other applications for Letters Patent.

It is well to provide fusible plugs at the junctions of the compensating-wires to each other, and also at the junctions of the compensating-coils themselves to the compensating net-work of wires. These plugs are large enough to carry the heaviest currents to which they may ever be subjected in normal work without heating, but in case of a grounding of the net-work occurring will melt and cut out the defective section or disconnect the grounded section from the rest of the system. This placing of plugs is illustrated in Fig. 16, three existing at the branch $f$, four plugs at $f'$, and one at $f^2$ and $f^3$, the terminals of the compensator C. It is preferable to run all the wires and mains underground, where possible, to avoid atmospheric disturbances. In cases where the compensator-coil is so cut off by its fuses melting, it is well also to cut off the primary coil by shunting it by a wire or resistance.

Fig. 17 shows an absolute cut-off for such purpose, T being the circuit substituted for P.

It is sometimes advisable to have the primary line arranged to automatically cut itself out when the compensator is cut off or defectively connected. Fig. 18 shows a preferred way of effecting the result. Whenever the secondary line of lamps is cut off in part, with no compensator-coil in action, the primary will induce in a short conductor parallel to it a much greater current than it will normally induce.

In Fig. 18, F is a band parallel to the primary P. The ends of F are joined by a fusible wire or strip, upon which a detent-lever, L, rests, the detent D controlling the cut-off switch S, by which the coil P is cut out of circuit, and, if desired, a resistance, R, substituted for it. Upon the fusion of the strip borne by F, due to excessive induction from the primary P, the lever L drops, detent D is released, and spring Z moves the switch to contact with circuit T. In the application of such a system as shown in Fig. 15, or of which it is a type, there being two or more primary lines, $x\,y\,x'\,y'$, working with one set of compensators and lines, the potentials of the lines $x\,y$ and $x'\,y'$ may be equal or different. When the lines have a number of primaries which are the equivalent of each other in current capacity and electro motive force, then the currents and electro-motive forces of $x\,y$ and $x'\,y'$ are best made equal, though a moderate difference may exist. If the primaries, however, in $x'\,y'$ are of heavier conductor and greater current capacity, the current in the line $x'\,y'$ may be greater than that in $x\,y$. In all such variations but one condition is demanded, which is that the compensators of the whole system be approximately capable of developing under the condition of full load of lights, no load of lights, or equally-distributed load of lights on the secondaries equal and opposing potentials, so that small current or no current is exchanged between them. Under such conditions the taking off or putting on lamps anywhere in the system, producing an unequally-distributed load, will be accompanied by activity in the compensators. The lightly-loaded section will feed current from its compensators along the compensating lines to the compensators of the heavily-loaded section, and prevent a fall of potential thereat, and save the lamps of the lightly-loaded section from excess of potential. In practice, in city or town lighting on the large scale, the turning on or off of lights at different points averages over considerable areas nearly the same, and the compensators are only called upon to equalize the local irregularities, which results in their exchanging current of moderate amounts over small distances only.

The compensators, it will be seen, are either generators of current or receivers of current, as the district in which they are is lightly loaded with lamps or heavily loaded, and, being of high potential, they effect their transfers with ease over considerable distances without much fall of potential.

In Fig. 19 the application of the compensating-coil to a compound motor and generator is illustrated. The current on the main circuit X Y drives the armature of a motor whose field-poles are indicated at N' S'. The generator-wires are in this case wound on the same armature and supply the local circuit L. The compensator-coil is wound on an armature mounted on the same shaft with the first and connected through a suitable commutator with the wires $C^5$, leading to the commutators of similar compensating-coils. In this case, as before, on the diminution of the number of lights or other translating devices between the wires L L, the energy of the motor is partially expended in increasing the potential at the commutator of the armature connected to the compensating-wires $C^5$. The special application of my invention to a compound motor and generator system of distribution is not, however, claimed herein specifically, but is reserved for the subject of a separate application.

What I claim as my invention is—

1. The combination, with a number of converters supplied with current from a common source, of compensating or equalizing coils connected together by wires independent of the circuit over which the converters are supplied, as and for the purpose set forth.

2. The combination, with induction-coils having primaries in series on an alternating-current line, of compensating or equalizing coils having like potential terminals connected together, as and for the purpose described.

3. The combination, with an alternating-current source, of a number of induction-coils each having three sets of conductors connected, respectively, as described, in series on the main to local or independent circuits containing translating devices, and in multiple by wires or connections independent of the main circuit and the local circuits containing the translating devices.

4. In a system of distribution by induction transfer, the combination, with two or more converters or transfer devices, of compensator or equalizer coils connected to a common conductor, as and for the purpose described.

5. In a system of electric distribution by means of converters, a compensator or equalizing coil, C, as and for the purpose described.

6. The combination, with a series of converters supplied from a common source, of compensator or equalizer coils applied to the same and connected together, as described, so that energy consumed in one converter having a light load in its local will be partially expended in generating current in the equalizer-coil, which latter will supply current to the other converters of the system, as and for the purpose described.

7. The combination, with two or more converters supplied with alternating currents from a common source, of compensating or equalizing coils applied to said converters and connected to one another, as described, whereby, on the occurrence of light load at one converter, the equalizer-coil applied thereto acts as a generator and supplies current to the equalizer of a more heavily-loaded converter.

8. The combination, on an alternating-current line, of two or more induction-coils having primary coils in series and having secondaries connected to separate local lines, and a third conductor or coil for each induction-coil, said third conductors having their like-potential terminals connected together.

9. The combination, with the induction-coil having the usual primary and secondary conductors, of a fine-wire compensating-coil, as and for the purpose described.

10. The combination, with a main line, of two or more converters, a local circuit for the converters, and compensating or equalizing coils having substantially equal potential during normal distribution of loads on the local circuits.

11. In a system of electric distribution, the combination, with two or more supply-circuits and induction-coils thereon, of a compensating net-work of conductors common to said coils and connected to compensating or equalizing conductors in which currents are set up directly or indirectly, as described, by the operation of the induction-coils.

12. The combination, with two or more induction-coil circuits carrying alternating currents and supplying the primaries of induction-coils in series, of compensating or equalizing coils connected in multiple to a net-work of wires embracing the district supplied.

13. The combination, with a coil and a switch governing the passage of current to or from the same, of a secondary conductor in which currents are set up by induction through the action of the currents in the coil and a fusible conductor acted upon by the induced current and normally holding the switch from operation.

Signed at Lynn, in the county of Essex and State of Massachusetts, this 2d day of March, A. D. 1887.

ELIHU THOMSON.

Witnesses:
M. L. THOMSON,
E. WILBUR RICE, Jr.